United States Patent Office 2,915,696
Patented Dec. 1, 1959

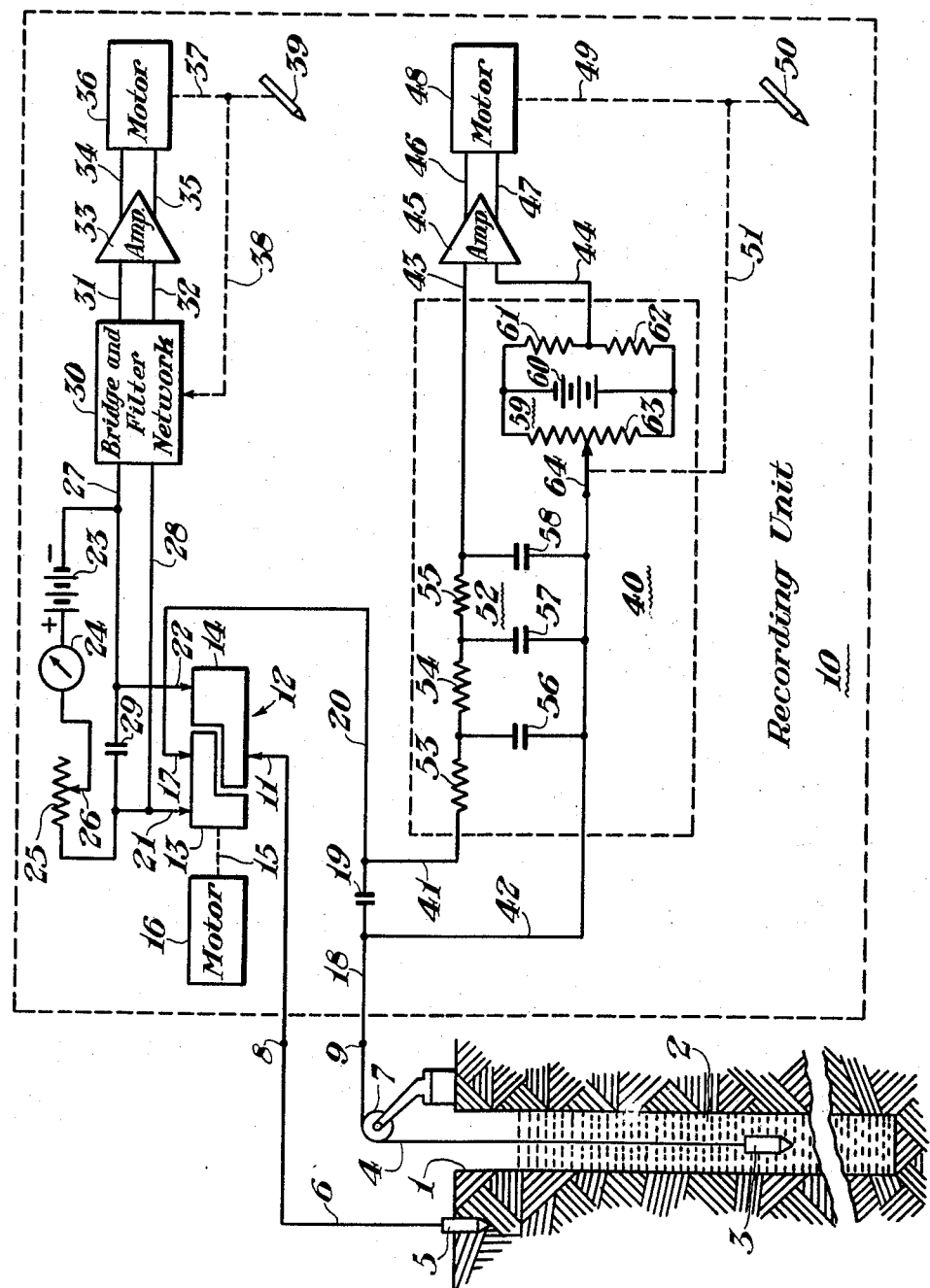

2,915,696

ELECTRICAL WELL-LOGGING APPARATUS

Eugene S. Cornish, Enid, Okla., and Donald E. Stark, Penn Township, Allegheny County, Pa., assignors to George E. Failing Company, Enid, Okla., a corporation of Delaware Application May 9, 1956, Serial No. 583,673

5 Claims. (Cl. 324—1)

This invention relates to electrical well-logging, and particularly to an improved dual recording unit therefore.

In prospecting for oil, and in fact in geological surveying generally, it has become common to evaluate the mineral contents of earth formations on the basis of correlations found to exist between the physical and chemical compositions of strata and the electrical properties thereof. Such correlations are generally based on measurements of currents artifically induced or naturally occurring in the formations under investigation. Two electrical properties which are thus measured are the electrical resistivity of a rock formation and the self-potential, or naturally occurring potential, which exists across the formation. Such measurements may be made, for example, by lowering into a bore hole traversing a given formation a suitable electrode, and measuring the potential between this electrode and a second electrode located at the surface to calculate the electrical values under consideration.

Since self-potential, or naturally occurring potentials, in rock formations, are generally unidirectional in character, it is further known to measure this voltage simultaneously with the measurement of the resistivity of the formations by employing an impressed alternating potential between the bore hole electrode and the surface electrode which can be filtered out from the self-potential. Such a measurement is shown, for example, by Patent No. 2,132,807 to Rust, Jr., et al. Such known arrangements, however, so far as is known, appear to have either afforded a low order of accuracy or required a large amount of equipment. Accordingly, it is an object of our invention to provide improved apparatus for carrying out measurements of this type which will be of a high order of accuracy and yet require a minimum amount of equipment.

It is a particular object of our invention to provide well-logging apparatus comprising a recording ohmmeter adapted to supply a constant current between a pair of spaced points in a region under investigation and to record the resistance between the points in terms of the voltage appearing across the terminals, a motor driven commutator for periodically reversing the connections between the recording ohmmeter and the points under investigation, and a recording voltmeter arranged to measure direct current potentials in the region under investigation and having means for shunting the alternating currents produced in the region by the recording ohmmeter.

Other objects and further advantages of our invention will appear as the description proceeds.

We shall first describe one embodiment of our invention, and shall then point out the novel features thereof in claims.

The drawing comprises a single view showing schematically one embodiment of our invention.

Referring to the drawing, which shows a form of our geological surveying apparatus particularly adapted for electrical well-logging, the apparatus is shown connected to investigate the earth formations in regions surrounding a bore hole 1 which is substantially filled with fluid, which could be, for example, water or drilling mud. By methods well known in the art, the nature of the strata traversed by bore hole 1 may be estimated by correlations based on measurements of the electrical properties existing between spaced points in the region surrounding the bore hole. In the embodiment shown, such measurements are made between an electrode 3 lowered into the bore hole on a combined cable and electrical conductor 4 and an electrode 5 placed in the ground at the surface near the bore hole, to which is attached an electrical cable 6. Cable 4 may be lowered into the bore hole to a required depth by any suitable means such as a hoisting reel shown schematically at 7. Reel 7 may include suitable depth recording means which, however, form no part of the invention and are not shown. Suitable detachable electrical connections, not shown, are provided between cables 4 and 6 and terminals 8 and 9 on the exterior of recording unit 10.

Terminal 8 is connected as shown to an output wiper 11 of a current reversing or commutating means which in the illustrated instance includes a commutator 12. Commutator 12 comprises two conducting segments 13 and 14 disposed for rotation by a shaft 15 and separated by suitable insulating means, not shown. Shaft 15 may be driven by a suitable conventional motor 16 which may preferably be a constant speed motor of any suitable construction. Terminal 9 is connected to a second output wiper 17 on commutator 12 by a circuit including a conductor or lead 18, condenser 19, and a conductor or lead 20.

A recording ohmmeter for measuring and recording the resistivity of the well formations is connected across a pair of input wipers 21 and 22 of commutator 12. This unit comprises a suitable source of unidirectional voltage 23 connected in series with an indicating ammeter 24 and a variable resistance 25 having an adjustable wiper 26 in one parallel electrical path across wipers 21 and 22, and a recording direct current voltmeter, to be described, connected across wipers 21 and 22 by conductors or leads 27 and 28. Filter capacitor 29 is also connected across wipers 21 and 22 as shown. It is thus obvious that a circuit is provided to supply an artificial current to the pair of wipers 21 and 22, the directional flow of which is periodically reversed by means of the commutating means to the pair of output wipers.

The recording voltmeter comprises a bridge and filter network 30 which is identical with bridge and filter network 40, to be described in detail below. It is sufficient at this point to note that network 30 includes essentially a filter network for shunting any alternating current voltage components which may appear across leads 27 and 28 and a rebalancing potentiometer to balance out direct current potential appearing between leads 27 and 28. The voltage output appearing across network 30 is applied by leads 31 and 32 to the input terminals of a conventional amplifier 33, which may include means for converting the direct current input to an alternating current output of a phase dependent on the polarity of the input in a manner well known in the art. Motor 36 positions a suitable recording pen 39 by a shaft shown schematically at 37 and also has a connection shown schematically at 38 for rebalancing the bridge in network 30. Components 30, 33 and 36, and their respective indicated connections to perform the function of a rebalancing and recording voltmeter, are so well known in the art that it is believed unnecessary to describe them in further detail. Suffice it to say that in response to a direct current potential appearing across leads 27 and 28, amplifier 33 is energized through network 30 and motor 36 will be driven to reposition the potentiometer in network 30 by means of follow-up connection 38 until a voltage is developed which is equal and opposite to that across leads 27 and 28. The recording pen 39 will accordingly produce an indication in accordance with the value of the voltage appearing across leads 27 and 28. Since the voltage appearing across wipers 21 and 22 of commutator 12 in response to the passage of the constant current produced by source 23 is a measure of the resistance between wipers 21 and 22, the indication of recording pen 39 will accordingly be a measure of the resistance opposed by an external circuit.

A second recording direct current voltmeter for measuring and recording self-potentials occurring in rock formations is connected by leads 41 and 42 that have shunt connections with the conductors 18 and 20 across condenser 19. This voltmeter may be of any suitable type, but as here shown comprises a bridge and filter network 40 corresponding to the bridge and filter network 30 described above, which has output leads 43 and 44. Leads 43 and 44 are connected to the input of an amplifier 45 corresponding to amplifier 33 described above. Output leads 46 and 47 of amplifier 45 are connected to drive a conventional servomotor 48 which may be identical with motor 36 described in connection with the recording ohmmeter. Motor 49 positions a recording pen 50 by means of a shaft 49 and has a rebalancing connection 51 to filter network 40.

Network 40 includes a filter 52 connected across leads 41 and 42. Filter 52 may be of any conventional design, but as here shown comprises series resistances 53, 54 and 55 and shunting capacitors 56, 57 and 58 connected as shown to pass direct current voltages but to shunt alternating current voltages. Condenser 58 of filter 52 is connected at one side to lead 43 and at the other side to lead 42 and to wiper 64 of bridge 59. Bridge 59 is energized by a suitable direct current source such as battery 60. Wiper 64 is mounted in adjustable contact with resistor 63, which is connected across battery 60 as shown. Wiper 64 is positioned by connection 51 from shaft 49 of motor 48. Amplifier lead 44 is connected at the junction of resistors 61 and 62, which are connected in series across source 60.

The operation of this embodiment of our invention will now be described. Assume that motor 16 is energized to rotate commutator 12 at a selected constant speed, and that electrode 3 is lowered into bore hole 1 by cable 4 on reel 7 at a suitable depth which may be indicated by conventional means, not shown, employed in connection with the operation of reel 7.

At the instant when the commutator is in the position shown in the drawing, a circuit extends between the positive terminal of battery 24 and the portion of resistance 25 which is selected by wiper 26, through wiper 21 and conducting segment 13 to wiper 17, over lead 20, through condenser 19, over lead 18 and through cable 4 to electrode 3, thence through the region of earth formations between electrode 3 and electrode 5, over lead 6, from terminal 8 to wiper 11, through conducting segment 14 of commutator 12 to wiper 22, and back to the negative terminal of battery 23.

Motor 16 may operate at any suitable speed such as to rotate commutator 12 at any convenient rate below a few hundred cycles per second, and for example this commutator might be rotated at 17.5 cycles per second. At a time when the commutator has been rotated through 180° from the position shown, the connections of the pair of input wipers 21 and 22 to the pair of output wipers 11 and 17 will be reversed, and at such times input wiper 22 connected to the negative terminal of battery 23 would be connected to output wiper 17 and input wiper 21 would be connected to output wiper 11. The rotation of commutator 12 will periodically reverse the connections as described.

Accordingly, while direct current flows in the circuit path between wiper 22, the negative terminal of battery 23, the positive terminal of battery 23, through meter 24 and resistance 25 to wiper 21, alternating current will flow between output wiper 11, terminal 8, cable 6, electrode 5, through the earth formations to electrode 3, over cable 4, to terminal 9, over lead 18, and through condenser 19 to lead 20 and wiper 17. Condenser 19 will have a value selected to present a low impedance to the flow of current at the frequency established by commutator 12.

Wiper 26 is adjusted on resistor 25 so that a constant current of selected magnitude flows through the circuits just described as indicated by the reading of meter 24. Since the resistance offered by the wipers, the conducting segments and the leads are relatively small, and the impedance of condenser 19 is low at the frequency of the current flowing in the external circuit, the resistance between wipers 21 and 22 will be substantially equal to the resistance between electrodes 3 and 5 through the region of the earth under investigation. As is well known in the art, such resistance is largely made up of the contact resistances of electrodes 3 and 5 and such resistances may be correlated in terms of resistivity in a manner well known and fully described in the prior art.

The voltage between wipers 21 and 22 developed in response to the passage of the constant current from source 23 will obviously be a measure of the resistance between electrodes 3 and 5. Further, it will be apparent that should a unidirectional self-potential exist between electrodes 3 and 5, this potential will not be transmitted across wipers 21 and 22 since condenser 19 presents a high impedance to the flow of such currents. It may be noted in this connection that the voltmeter circuit connected across condenser 19 by leads 41 and 42 does not permit any substantial flow of D.C. current around condenser 19 due to the high input impedance of the amplifier 45.

The voltage appearing between wipers 21 and 22 will be fairly smooth except for small fluctuations due to the times at which wipers 11 and 17 pass over the insulating segment between conductors 13 and 14. By design methods well known in the art, which form no part of this invention and are accordingly not described, this off-time may be reduced to a small fraction of the on-time of the commutator. Any residual fluctuations which occur are filtered out in shunting capacitor 29 connected between wipers 21 and 22. The voltage appearing across these wipers is accordingly a D.C. voltage of a magnitude representing the resistivity of the formation under investigation. This voltage is measured in the voltmeter previously described by the motion of motor 36 which is necessary to rebalance bridge network 30 through follow-up connection 38. This action will be described in more detail in connection with the self-potential measuring voltmeter, which operates in an identical manner. It is sufficient to note here that the motion of recording pen 39 will follow motor 36 in rebalancing bridge 30 and will therefore trace a path which is an indication of the resistivity changes in the formations as electrode 3 is moved from one position to another in the bore hole.

The action of the recording unit in measuring and recording self-potential will now be described. A self-potential in the formations adjacent bore hole 1 which exists between electrodes 3 and 5 will be transmitted from electrode 5 through cable 6 to terminal 8 and thence to wiper 11. It may then be transmitted to wiper 17 by one of two circuit paths. The first of these extends from wiper 11 through conducting segment 14 as shown, over wiper 22, through battery 23, meter 24 and resistance 25 in series, and over wiper 21 through segment 13 to wiper 17. The second circuit path, which is effective when the commutator is in the position 180° removed from that shown, exists from wiper 11, through conducting segment 13, over wiper 21 and through resistance 25, meter 24 and battery 23 in series, to wiper 22, and through conducting segment 14 to wiper 17. The periodic reversing action of commutator 12 will cancel the direct voltage effect of battery 23 between wipers 11 and 17 by converting it into an alternating voltage appearing between wipers 11 and 17 in the manner previously described. Moreover, the self-potential voltage from the bore hole will not appear as a direct current component across wipers 21 and 22 to be measured by the voltmeter connected across leads 27 and 28, since this voltage is converted to alternating current at these terminals by the commutator action in the same manner as is the voltage of battery 23 appearing in the external cirucit.

The direct current circuit extending over the described alternating paths is continued over wiper 17 and lead 20 to conductor 41, and through resistors 53, 54 and 55 in network 40 to lead 43 at the input of amplifier 45. The return circuit path extends from the other lead 44 of amplifier 45, through bridge 59, over wiper 64, over leads 42 and 18, and through cable 4 to electrode 3.

It will be apparent from the above description that a circuit exists whereby a potential proportional to the self-potential between electrodes 3 and 5 is applied across terminals 43 and 44 of amplifier 45, assuming that the wiper 64 of bridge 59 is in its central position in which no output voltage is generated by the bridge. Any alternating components of voltage have been substantially shunted out at this point by the cumulative action of capacitors 19, 56, 57 and 58.

Amplifier 45 is accordingly energized by a direct current voltage to produce an output at terminals 46 and 47 which drives motor 48. Motor 48 will rotate its shaft 49 to position recording pen 50 and at the same time move wiper 64 on resistance 63 over connection 51. When wiper 64 is displaced from its central position, bridge 59 is unbalanced and a direct current potential appears between wiper 64 and lead 44 which opposes the self-potential developed across electrodes 3 and 5. When this voltage is equal and opposite to the self-potential voltage, the amplifier will be balanced and motor 48 will stop. The position of recording pen 50 will accordingly indicate the self-potential voltage at the point in the well under investigation.

It will be apparent from the above description that we have described a dual recording unit which will position pens 39 and 50 simultaneously in accordance with the resistivity and self-potential, respectively, of a region to be investigated. Further, with the arrangement of parts shown, in which the voltage measuring component of our recording ohmmeter is connected to the constant current supplying component on the same side of the commutator, and the self-potential measuring unit is connected in the external circuit on the outut side of the commutator, we have provided a dual recording unit in which only a single set of commutator contacts is required.

While we have described a specific embodiment of our invention in detail, it will be apparent to those skilled in the art that many changes and modifications could be made in the circuit arrangement shown without departing from the scope of our invention. Accordingly, we do not wish to be limited to the details of the embodiment shown, but only by the scope of the following claims.

Having thus described our invention, what we claim is:

1. A recording unit for indicating electrical resistivity of a substance to an artificial current introduced through the substance from spaced apart electrodes and simultaneously the naturally occurring self potentials existing in the substance between the electrodes, said recording unit including a source of artificial current, a circuit connected with the source of artificial current, conductors having terminals adapted for connection with the electrodes, current reversing means interconnecting the artificial current supply circuit with the conductors, actuating means connected with the current reversing means for periodically reversing the direction of current flow to the electrodes, a unidirectional voltage rebalancing and recording means having series connection with said current supply circuit and parallel connection with the conductors through said current reversing means, a capacitor in the current supply circuit between connections thereof with the current reversing means for filtering out any residual fluctuations whereby the voltage appearing across the said connections is a direct current voltage of a magnitude representing the resistance of the substance under investigation and the magnitude of which is recorded by the said recording means, a second unidirectional voltage rebalancing and recording means having conductors providing shunt connections with one of the conductors on the terminal side of the current reversing means, and a condenser in the said one conductor between said shunt connections and having a value to present low impedance to flow of current at the frequency established by the reversing means and a high impedance to unidirectional self potential whereby the flow of unidirectional current resulting from the self potentials existing in the substance is completed through the current reversing means and the source of artificial current supply to the said second unidirectional voltage rebalancing and recording means while the direct voltage effect of the artificial current supply is canceled out by action of the current reversing means to record the naturally occurring self potentials of the substance.

2. A recording unit for indicating electrical resistivity of a substance to an artificial current introduced through the substance from spaced apart electrodes and simultaneously the naturally occurring self potentials existing in the substance between the electrodes, said recording unit including a source of artificial current, a circuit connected with the source of artificial current, conductors having terminals adapted for connection with the electrodes, current reversing means interconnecting the artificial current supply circuit with the conductors, actuating means connected with the current reversing means for periodically reversing the direction of current flow to the electrodes, a unidirectional voltage rebalancing and recording means having series connection with said current supply circuit and parallel connection with the conductors through said current reversing means, a capacitor in the current supply circuit between connections thereof with the current reversing means for filtering out any residual fluctuations whereby the voltage appearing across the said connections is a direct current voltage of a magnitude representing the resistance of the substance under investigation and the magnitude of which is recorded by the said recording means, a second unidirectional voltage rebalancing and recording means having conductors providing shunt connection with one of the conductors on the terminal side of the current reversing means, a condenser in the said one conductor between said shunt connections and having a value to present low impedance to flow of current at the frequency established by the reversing means and a high impedance to unidirectional self potential whereby the flow of unidirectional current resulting from the self potentials existing in the substance is completed through the current reversing means and the source of artificial current supply to the said second unidirectional voltage rebalancing and recording means while the direct voltage effect of the artificial current supply is canceled out by action of the current reversing means to record the naturally occurring self potentials of the substance, and means cooperating with said condenser for shunting any alternating currents from said second recording means.

3. A recording unit for indicating electrical resistivity of a substance under investigation to an artificial current introduced through the substance by spaced electrodes and simultaneously indicating naturally occurring self potentials existing in the substance between the electrodes, said recording unit including a source of artificial current, a commutator having segments insulated with respect to each other, a pair of wipers in contact with the respective segments of the commutator, a circuit connecting the source of artificial current supply with the wipers, a second pair of wipers contacting the segments of the commutator, conductors connected with the second pair of wipers and adapted for connection to the electrodes, means for rotating the commutator for periodically reversing current flow between the electrodes, a unidirectional voltage rebalancing and recording means having series connection with said circuit supplying current to the first named pair of wipers and parallel connection with the said first named pair of wipers, a capacitor between the wipers composing the first named pair of wipers for filtering out any residual fluctuations whereby the voltage appearing across the first named pair of wipers is a direct current voltage of a magnitude respresenting the resistance of the substance under investigation and the magnitude of which is recorded by the said recording means, a second unidirectional voltage rebalancing and recording means having shunt connections with one of the conductors which connects the second named pair of wipers with the electrodes, a condenser between said shunt connections and having a value to present low impedance to flow of current at the frequency established by the commutator and a high impedance to unidirectional self potential whereby the flow of unidirectional current resulting from the self potentials existing in the substance is completed through the commutator and the source of artificial current supply to the said second unidirectional voltage rebalancing and recording means while the direct voltage effect of the artificial current supply is canceled out by action of the commutator to record the naturally occurring self potentials.

4. A geological surveying apparatus for determining simultaneously electrical resistivity of earth formations to an artificial current introduced through the formations and the naturally occurring self potentials existing in the formations, said surveying apparatus including a pair of electrodes adapted to be located in a region to be surveyed and one being movable relatively to the other, a source of artificial current, a circuit connected with the source of artificial current, conductors having connection with the electrodes, current reversing means interconnecting the artificial current supply circuit with the conductors, actuating means connected with the current reversing means for periodically reversing the direction of current flow to the electrodes, a unidirectional voltage rebalancing and recording means having series connection with said circuit supply current and parallel connection with the conductors through said current reversing means, a capacitor in the current supply circuit between connections thereof with the current reversing means for filtering out any residual fluctuations whereby the voltage appearing across the said connections is a direct current voltage of a magnitude representing the resistance of the formations under investigation and the magnitude of which is recorded by the said recording means, a second unidirectional voltage rebalancing and recording means having shunt connections with one of the conductors on the electrode side of the current reversing means, and a condenser between said shunt connections and having a value to present low impedance to flow of current at the frequency established by the reversing means and a high impedance to unidirectional self potential whereby the flow of unidirectional current resulting from the self potentials existing in the formations is completed through the current reversing means and the source of artificial current supply to the said second unidirectional voltage rebalancing and recording means while the direct voltage effect of the artificial current supply is canceled out by action of the current reversing means to record the naturally occurring self potentials of the formations.

5. A geological surveying apparatus for determining resistivity of earth formations to an artificial current and simultaneously the naturally occurring self potentials existing in the formations, said apparatus including a pair of electrodes adapted to be located at spaced points in a region to be surveyed, a source of artificial current, a commutator having segments insulated with respect to each other, a pair of wipers in contact with the respective segments of the commutator, a circuit connecting the source of artificial current supply with the wipers, a second pair of wipers contacting the segments of the commutator, conductors connecting the second pair of wipers with the electrodes, means for rotating the commutator for periodically reversing current flow between the electrodes, a unidirectional voltage rebalancing and recording means having series connection with said circuit supplying current to the first named pair of wipers and parallel connection with the said first named pair of wipers, a capacitor between the wipers composing the first named pair of wipers for filtering out any residual fluctuations whereby the voltage appearing across the first named pair of wipers is a direct current voltage of a magnitude representing the resistance of the formations under investigation and the magnitude of which is recorded by the said recording means, a second unidirectional voltage rebalancing and recording means shaving shunt connections with one of the conductors which connects the second named pair of wipers with the electrodes, a condenser between said shunt connections and having a value to present low impedance to flow of current at the frequency established by the commutator and a high impedance to unidirectional self potential whereby the flow of unidirectional current resulting from the self potentials existing in the formations is completed through the commutator and the source of artificial current supply to the said second unidirectional voltage rebalancing and recordiing means while the direct voltage effect of the artificial current supply is canceled out by action of the commutator to record the naturally occurring self potentials of the formations.

References Cited in the file of this patent

UNITED STATES PATENTS

| | | |
|---|---|---|
| 2,132,807 | Rust | Oct. 11, 1938 |
| 2,268,137 | Evjen | Dec. 30, 1941 |
| 2,343,140 | Evjen | Feb. 29, 1944 |
| 2,712,627 | Doll | July 5, 1955 |
| 2,779,912 | Waters | Jan. 29, 1957 |
| 2,813,249 | Doll | Nov. 12, 1957 |